Dec. 17, 1940.  E. J. DILLMAN  2,225,586
CONTROL DEVICE
Original Filed April 28, 1937
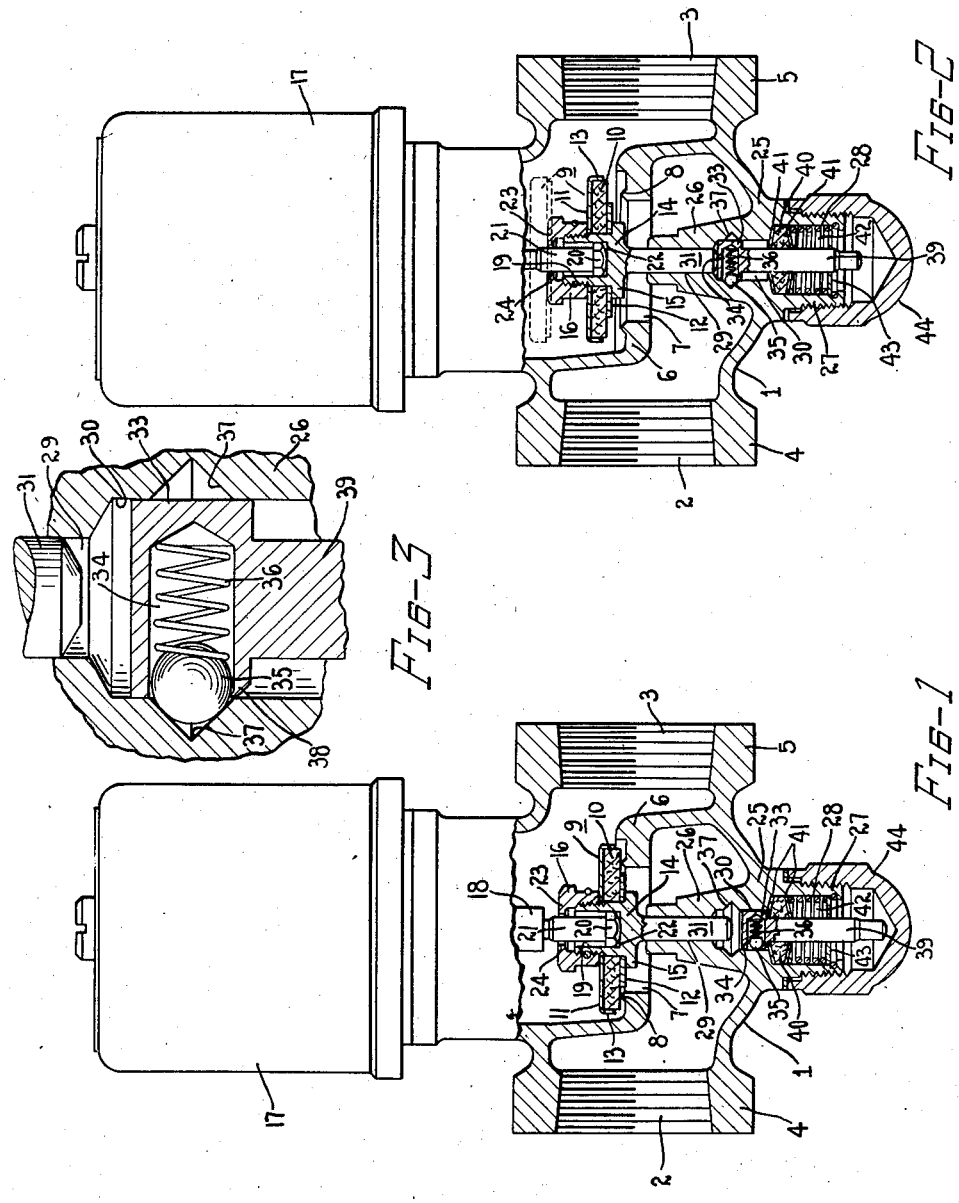
INVENTOR
Earnest J. Dillman
BY
Andrew K. Toneda
his ATTORNEY

Patented Dec. 17, 1940

2,225,586

UNITED STATES PATENT OFFICE 2,225,586

CONTROL DEVICE

Earnest J. Dillman, Detroit, Mich., assignor to Detroit Lubricator Company, Detroit, Mich., a corporation of Michigan Application April 28, 1937, Serial No. 139,555
Renewed March 31, 1939

15 Claims. (Cl. 137—139)

My invention relates generally to automatically operable controls and more particularly to manual operable means for actuating the control.

One of the objects of my invention is to provide for an automatically operated control, new and improved, manually operable mechanism for actuating the control.

Another object of my invention is to provide new and improved, manually operable mechanism for opening and releasably holding a normally automatically operable valve in an open position.

Another object of my invention is to provide manually operable mechanism for the above mentioned purpose which will be efficient in operation yet inexpensive to manufacture.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 1 is a view shown partly in elevation and partly in vertical central cross section, of a control device embodying my invention;

Fig. 2 is a view similar to Fig. 1 showing the operating parts in different positions from those shown in Fig. 1, and Fig. 3 is an enlarged fragmentary view in section showing certain structural details of my device.

Referring to the drawing by characters of reference the control device shown includes a hollow valve body 1 having an inlet 2 and an outlet 3 which may be defined by oppositely disposed, external hollow bosses 4 and 5 respectively, that may be threaded for connection in a fluid flow line (not shown). Within the body 1 and integral therewith there is a wall 6 separating the inlet 2 from the outlet 3, and through the wall 6 there is an aperture 7 for flow of fluid from the inlet side to the outlet side of the valve body 1. Preferably the wall 6 has an upwardly directed, extended portion 8 around the opening of aperture 7, to provide an upwardly facing port and seat for a reciprocal valve member, designated in general by the numeral 9, which cooperates with the seat 8 to permit and/or to stop flow of fluid through the valve body 1.

In the present instance, the valve member 9 is comprised of several parts including a valve face member or disc 10 that is adapted to engage the seat 8, as shown in Fig. 1, to close the aperture 7 to flow therethrough. The valve disc 10 may be and preferably is formed of a compressible material and is preferably positioned and held between a pair of plate members 11, 12 which serve to retain the form of the compressible member 10. Preferably the upper plate member 11 has a downturned, continuous flange 13 that receives or fits over the valve disc 10 and prevents a circumferential expansion of the valve disc. The plate members 11, 12 and the valve disc 10 are preferably provided with centrally disposed, aligning apertures for receiving a rod member 14 that serves in part to secure the disc and plates together and serves in part to guide the valve member 9. The rod member 14 may have an external annular flange 15 for abutment against the underside of the lower plate member 12, and the disc 10 and plates 11, 12 may be clamped together and secured to the rod 14 between the rod flange 15 and a nut 16 that may screw thread onto the upper end of the rod and abut the upper surface of the plate 11.

Enclosed in a casing 17 which may be mounted on the upper end of the valve body 1, there is an automatic actuator for the valve member 9, preferably an electromagnet or solenoid that may be of any suitable type. The solenoid includes the usual movable core 18 and, in the present instance, the core 18 and valve member 9 have a lost motion connection therebetween. To this end the rod 14 may have a chamber 19 in its upper end wherein an enlarged end portion or head 20 of a connecting rod 21, carried by the core 18, may have limited longitudinal or vertical movement relative to the valve member 9. The chamber 19 may be in the form of a bored recess providing an upwardly facing inner end wall 22, and the nut 16 may be formed to provide an opposite end wall 23 having an aperture 24 therethrough for freely receiving the connecting rod 21. When the solenoid is energized the armature 18 will move upward and after predetermined movement the rod head 20 will engage the chamber end wall 23 and lift the valve member 9 away from its seat. This lost motion connection permits the core 18 to gain momentum before the solenoid takes on the additional load of lifting the valve member 9. Upon deenergization of the solenoid the valve 9 seats and the core 18 continues downward until the head 20 engages the chamber end wall 22, to which it imparts a sharp impact to tightly seat the valve.

The valve body 1 is preferably formed at its lower wall with an enlarged, integral portion 25 to provide a housing for manually operable mechanism for actuating the valve 9, and this enlarged portion preferably includes an upstanding, internal boss 26 and a depending, external boss 27. The enlarged body portion 25 is preferably vertically bored and counterbored to provide three axially aligned, intersecting bores comprising a relatively large bore 28 opening at the lower end of the external boss 27, a relatively small bore 29 opening at the upper end of the internal bore 26, and an intermediate bore 30. The valve rod 14 preferably has a depending stem portion 31 that may be slidably received and guided in the upper bore 29 and when the valve memer 9 is seated, a lower end portion of the stem 31 preferably projects downward into the intermediate bore 30, as shown in Fig. 1.

Slidably received and vertically movable in the intermediate bore 30 there is a plunger or push rod member 33 for manually actuating the valve member 9, the plunger member 33 being shown in its inactive position in Fig. 1 and in its active position in Figs. 2 and 3. The plunger member 33 has a chamber 34, preferably a bored recess extending transversely in the plunger and opening at one end through the side wall of the plunger. Disposed in the bore 34 there is a latch member or detent 35 which, as shown, may be a ball, and a coil spring 36 may be provided and disposed in the bore 34 to urge the ball 35 outward. In the wall of the intermediate bore 30, adjacent its upper end, there is provided an annular socket or recess 37, preferably a V-shaped groove, in which the ball latch 35 is adapted to extend or position under the force of the spring 36 upon predetermined upward movement of the valve 9 by the plunger 33. Outward movement of the latch member 35 is preferably limited, and to this end the wall at the opening of the bore 34 may have an inwardly peened over portion 38.

The plunger member 33 preferably has a depending stem portion 39 that may extend centrally through the large bore 28 and project externally thereof below the lower end of the external boss 27. Packing material 40 is preferably provided around the plunger stem 39, within the large bore 28, and the packing material 40 is preferably disposed between two metallic disc members 41 that have aligning apertures for receiving the stem 39. The upper disc member 41 seats against the downwardly facing, internal shoulder formed between the intermediate bore 30 and the lower or larger bore 28, and the upper disc may be held against said shoulder and the packing material held under compression, by a helical coil spring 42 positioned in the bore 28. The coil spring 42 is under compression having one end abutting the lower disc member 41 and the other or lower end of the spring may seat on an abutment 43 fixed against movement to the wall of the bore 28. The lower end of the plunger stem 39 may be enclosed by a cap 44 that may be screw threaded onto the depending external boss 27.

The herein described device, among other uses, may be employed to control flow of fuel to a burner (not shown) and when so employed is usually controlled by a thermostat (not shown). In normal operation, when the solenoid is energized, its core 18 will be attracted and will move upwardly and after predetermined upward movement of the core the head 20 of the rod 21 will engage the end wall 23 of the chamber 19 and move or pull the valve member 9 upward away from its seat, to a position such as that shown in dotted lines in Fig. 2. Upon deenergization of the solenoid its core 18 will descend, carrying with it the valve member 9 which, upon predetermined downward movement, will engage its seat 8. After initial seating of the valve 9 the core 18 will continue to descend until the head 20 of rod 21 abuts the lower chamber end wall 22, to which it gives a sharp impact to tightly seat the valve 9. If the current should fail, or if for any reason the solenoid would not operate, the valve 9 may be opened by means of the manually operable plunger 33, to which ready access may be had by removing the cap 44.

To open or unseat the valve member 9 the plunger 33 is pushed upward and through engagement with the valve stem 31 moves the valve member 9 upward away from its seat 8. After predetermined upward movement of the valve member 9 by the plunger 33, the spring pressed latch or ball 35 will lodge in its cooperative socket 37 and hold the valve member in an open position, such as the position shown in full lines in Fig. 2. In this position the valve member 9 is preferably intermediate closed and the open position of the valve shown in dotted lines in Fig. 2 to which it is moved by the solenoid. The latch 35 may be released to permit the valve member 9 to descend to its seat 8 by pulling the plunger member 33 downward, which will cause the latch 35 to move inward and compress its spring 36. If the current should come on while the spring pressed latch 35 is serving to hold the valve member 9 open, the solenoid will raise the valve member to the position shown in dotted lines in Fig. 2. Upon deenergization of the solenoid the core 18 and valve member 9 will descend and the valve stem 31 will engage the plunger 33 and push the same downward whereby to release the manual valve opening means to permit the valve member 9 to seat.

What I claim and desire to secure by Letters Patent of the United States is:

1. A valve of the character described comprising a casing having a passageway therethrough including a valve port, a valve member controlling said port and movable toward open and closed positions, manually operable means for moving said valve member to partially open position, a spring pressed latch means to hold said manually operable means in position to hold said valve member in partially open position, and means to move said valve member to a further open position and out of engagement with said manually operable means, said valve member acting upon movement from said further open position toward closed position to release the latch means by impact and move said operable means to inactive position.

2. In a valve, a casing having a port, a movable valve member controlling said port, a manually operable plunger independent of and cooperable with said valve member for moving said valve member toward open position, automatically operable means for moving said valve member further toward open position, means providing a socket, a movable latch member carried by said plunger and engageable in said socket to hold said plunger in a position to hold said valve member open, and yieldable means urging said latch member into said socket, the force exerted by said yieldable means being overcome by said valve member upon movement of said valve member toward closed position.

3. In a valve, a casing having a port and having a chamber, a movable valve member controlling said port, a plunger member reciprocal in said chamber and having an active and an inactive position and operable to move said valve member to an open position, said plunger member in inactive position being out of engagement with said valve member, said plunger member having a chamber opening through a side wall thereof, a latch member in said second-named chamber, a socket in the side wall of said first-named chamber for receiving said latch member, and a spring in said second-named chamber and urging said latch member outwardly, said valve member upon movement toward closed position from said open position impacting said plunger member to release said latch member and move said plunger member to said inactive position.

4. In a valve, a casing having an inlet chamber and an outlet chamber, a wall member between said chambers and having a port therethrough, a valve member controlling said port and movable toward open and closed positions and having a depending stem, an internal boss having an aperture therethrough for receiving said stem to guide said valve member in reciprocal movement, a manually operable reciprocal plunger member guided in said aperture and operable to move said valve member toward open position, and a latch member in said manual member, the wall of said aperture having a socket to receive said latch member to hold said valve member in partially open position, said latch member being releasable to permit the closing of the valve member upon impact of said valve member returning toward closed position from a further open position.

5. A valve of the character described, comprising a casing having a passageway therethrough with a valve port, a valve member controlling flow through said port, means operable to hold said valve member in an elevated position, said casing having a guide bore alined with said port, reciprocal means in said bore and movable toward said port, said means being engageable with said valve member and operable to move said valve member toward said elevated position, and yieldable latch means cooperable with said reciprocal means to hold said valve member releasably against its potential force in a position intermediate closed position and said elevated position, said valve member acting upon movement from said elevated position to engage said reciprocal means to overcome said latch means so that said reciprocal means will be moved out of holding position.

6. A valve of the character described, comprising a casing having an inlet and an outlet, a wall member in said casing intermediate said inlet and said outlet and having a valve port, an upward projecting internal boss and a downward projecting external boss in substantial alinement and projecting from said casing bottom wall concentric with said valve port, said bosses and said bottom wall having a bore therethrough comprising a portion of small cross-sectional area, an intermediate portion, and a portion of relatively large cross-sectional area, said small portion being at the inner end of said bore and adjacent said valve port and said large portion being at the other end of said bore, a valve member cooperable with said valve port to control the flow of fluid therethrough and having a stem portion reciprocable in said small bore portion and having a portion extending into said intermediate portion when said valve member is in closed position, a plunger member for reciprocal movement in said intermediate portion having a stem portion extending through said large portion and having a chamber, a latch member in said chamber, a recess in the wall of said intermediate bore portion to receive said latch member, said plunger member engaging said stem portion to move said valve member toward open position upon movement of said latch member toward said recess, said recess being so positioned that said valve member will be held in partially open position upon movement of said latch member into said recess, means to move said valve member to a further open position, said latch member being releasable upon the impact of said valve member from said further open position and moved thereby out of contact with said valve member, and a cap member for said external boss and removable therefrom.

7. A valve of the character described comprising a casing having an inlet and an outlet in substantial alinement, a wall member in said casing intermediate said inlet and said outlet and having a substantially horizontal section including a valve port, an upward projecting internal boss and a cylindrical downward projecting external boss screw threaded on its outer periphery, said bosses being in substantial alinement and projecting from said casing bottom wall concentric with said valve port, a bore through said bosses and said bottom wall comprising a small bore portion, an intermediate bore portion and a large bore portion so arranged that the small portion is adjacent the valve port end of said bore and said large portion is at the other end of said bore, a valve member cooperable with said port to control the flow of fluid therethrough and having a stem portion reciprocable in said small bore portion and having a portion extending into said intermediate portion when said valve member is in closed position, a plunger member for reciprocal movement in said intermediate portion comprising a stem portion extending through said large portion, said plunger member having a transverse bore, a ball and a helical coil spring within said transverse bore, said spring urging said ball in an outward direction, the wall of said intermediate bore portion having a V-shaped groove cooperating with said ball to form a latch and hold said valve member in partial open position, said spring being overcome to release said ball upon impact of said valve member in a valve closing direction, and a cap member screw threaded onto said external boss in fluid-tight relation thereto.

8. In a valve, a casing having an inlet chamber and an outlet chamber, a wall member between said chambers and having a port therethrought, a valve member controlling said port and movable toward open and closed positions and having a depending stem, an internal boss having an aperture therethrough for receiving said stem and guiding said valve member in reciprocal movement, said aperture having a portion of enlarged cross-sectional area at its end opposite said port, a manually operable reciprocal plunger member guided in said aperture with a portion extending into said enlarged portion and operable to move said valve member toward open position, a latch member in said manual member, the wall of said aperture having a socket to receive said latch member to hold said valve member in partially open position, said latch member being releasable to permit the closing of the valve member upon impact from said valve member returning toward closed position from a further open position, a plurality of metallic disc members in said enlarged portion having alining apertures therethrough for reception of said plunger member extending portion, packing material between said disc members, a helical coil spring within said enlarged portion, and means to hold said spring under compression to urge said disc members together thereby compressing said packing material into intimate relation with said plunger extending portion.

9. In a device of the character described, a pair of relatively movable members, a manually operable plunger independent of and cooperable with one of said members for moving said one member toward a given position relative to the other of said members, automatically operable means for moving said one member to said given position, means providing a socket, a movable latch member carried by said plunger and engageable in said socket to hold said plunger in a position to hold said one member in the position to which said one member is moved by said plunger, and yieldable means urging said latch member into said socket, the force exerted by said yieldable means being overcome by said one movable member upon movement of said one movable member in a direction away from said given position so that said plunger will be returned to an inactive position.

10. In an apparatus of the character described, a movable controlling means having an active and an inactive position, means for moving said controlling means from said inactive position to said active position, and means normally in a position disengaged from said controlling means and operable to move and hold said controlling means in a position intermediate said active position and said inactive position, said controlling means being operable upon movement from said active position to said inactive position to move said third-named means to said disengaged position.

11. In an apparatus of the character described, a movable controlling means having an active and an inactive position, means for moving said controlling means from said inactive position to said active position, means normally in a position disengaged from said controlling means and operable to move said controlling means into a position intermediate said active position and said inactive position, and releasable means for holding said controlling means in said intermediate position, said controlling means being operable upon movement from said active position to said inactive position to release said releasable means and to move said third-named means to said disengaged position.

12. In an apparatus of the character described, a movable controlling means having an active and an inactive position, means for moving said controlling means to said active position, manually operable means normally in a position disengaged from said controlling means and operable to move said controlling means into a position intermediate said active position and said inactive position, and releasable means carried by said manual means for holding said controlling means in said intermediate position, said controlling means being operable upon movement from said active position to said inactive position to release said releasable means and to move said manual means to said disengaged position.

13. In a valve, a casing having an inlet chamber and an outlet chamber, a wall member between said chambers and having a port therethrough, a valve member controlling said port and movable toward open and closed positions and having a depending stem, an internal boss having an aperture therethrough for receiving said stem and guiding said valve member in reciprocal movement, said aperture having a portion of enlarged cross-sectional area at its end opposite said port, a manually operable reciprocal plunger member guided in said aperture with a portion extending into said enlarged portion and operable to move said valve member toward open position, a latch member in said manual member, the wall of said aperture having a socket to receive said latch member to hold said valve member in partially open position, said latch member being releasable to permit the closing of the valve member upon impact from said valve member returning toward closed position from a further open position, and means to prevent flow of fluid between said plunger extending portion and said casing.

14. A valve of the character described comprising a casing having a passageway therethrough including a valve port, a valve member controlling said port and movable toward open and closed positions, manually operable means having an active position and an inactive position, said manually operable means being movable toward its active postion to move said valve member to partially open position, means for positioning and maintaining said manually operable means in said active position, and means to move said valve member to a further open position out of contact with said manual means, said positioning means being so constructed and arranged relative to said valve member further open position and to the mass of said valve member that said valve member upon movement toward closed position from said further open position is operable to impact and to move said manually operable means to its inactive position.

15. A valve of the character described comprising a casing having a passageway therethrough including a valve port, a valve member controlling said port and movable toward open and closed positions, manually operable means having an active and an inactive position, said manually operable means on movement to its active position moving said valve member to a partially open position, releasable means movable relative to said casing and operable to hold said manually operable means in said active position, and electrically operable means operable when energized to move said valve member further toward open position and out of engagement with said manually operable means, said valve member on deenergization of said electrically operable means moving toward closed position and impacting said manually operable means so that said releasable means is moved out of holding position, said valve member also acting to move said manually operable means to said inactive position so that said valve member can move to closed position.

EARNEST J. DILLMAN.